UNITED STATES PATENT OFFICE.

JULIUS SCHROEDER, OF PETSCHEK, AUSTRIA, ASSIGNOR TO L. WEINRICH, OF SAME PLACE.

IMPROVEMENT IN PROCESSES OF OBTAINING SUGAR FROM MOLASSES.

Specification forming part of Letters Patent No. 119,886, dated October 10, 1871.

*To all whom it may concern:*

Be it known that I, JULIUS SCHROEDER, of Petschek, Bohemia, Austria, have invented a new and Improved Process of Obtaining Sugar from Boiled-Sugar Mass; and I do hereby declare that the following is a full, clear, and exact description thereof.

My invention consists in a novel process of obtaining sugar from the mass obtained by boiling raw sugar, by exposing such mass in a chilled, congealed, or solidified condition, irrespective of the means by which the chilling is produced, to centrifugal action in a centrifugal machine similar, in a general way, to the machines now used for separating uncrystallizable from the granular portions of sugar. It is an essential feature of my improved process that the congealed mass be worked in the machine in the form of blocks or slabs, as contradistinguished from being mashed or broken up into small pieces, whereby the uncrystallizable portion of the mass is more effectually removed. The invention also includes an exposure of the congealed mass when in the centrifugal machine to warm water as produced by a mixture of steam and air within the revolving perforated box or cylinder of the machine, for the purpose of more effectually separating or collecting the crystallizable portions of the mass and for decolorizing the same.

To put into practice my improved process the sugar mass, after boiling in the usual way, is first put into molds or forms of suitable shape, in which it is allowed to chill or solidify, and then transferred, either in the molds or detached therefrom, to the centrifugal machine. These molds may be of varied construction, and of such shape, size, and so applied, as that they or their contents, or both, equalize the load on the machine. Thus, they may be of a segmental shape corresponding, as regards their outer surfaces, with the inner periphery of the perforated cylinder of the machine, and of such length that their contents, when ejected from the molds, will form a series of blocks capable of building up into a ring within said cylinder. If it is designed to introduce the sugar mass, together with the molds, into the machine, then the molds may be constructed not only with open outer sides, but with a sieve-like bottom, and an opening, capable of being closed at pleasure, to provide for escape of uncrystallizable portions of the mass; or the mass may be brought into proper form by putting it into a chest composed of chambers corresponding with the shape and size required for the blocks, and formed by partitions more or less removable, and certain of which are perforated to equalize the flow of the mass into the chambers when filling the chest, after which the mass is chilled. The chambers may either be of rectangular or curved shape. Another construction is to form or chill the mass into pieces, forming, when fitted within the working cylinder, a series of segments, the chord faces of which may be covered by perforated plates. In all such cases the working cylinder of the machine must be constructed so as to readily admit of the introduction of the chilled or solidified mass.

By this process, in an ordinary centrifugal machine, five minutes has sufficed to expel the uncrystallizable portion of the mass and produce a yellow sugar of first quality.

To make a white sugar the centrifugal cylinder should be inclosed by a cover, having a tube projecting through it, open at its outer end for the introduction of air through it into the interior of the cylinder, together with a jet or jets of steam, the two combining to produce a mist within the cylinder, or fine spray of warm water, which dissolves the uncrystallizable portion of the mass, but does not injure or attack the sugar crystals.

By my improved process seventy-five per cent., or thereabout, of yellow sugar, first product, may be obtained directly from the mass, or sixty per cent. of white sugar, without treating with sirup; and the sugar can be put on the market at a great saving of time, labor, and space.

What is here claimed, and desired to be secured by Letters Patent, is—

1. The process, herein described, of obtaining sugar from boiled-sugar mass by exposing it in a chilled and molded condition to centrifugal action in a centrifugal sugar-machine, substantially as specified.

2. In combination with the treatment of the mass, as described in the preceding clause of the claim, the use of warm water in a mist or spray as produced by a mixture of air and steam within the revolving cylinder of the centrifugal machine, essentially as and for the purpose herein set forth.

Witnesses:            J. SCHROEDER.
   PETER BARTHEL,
   F. WIRTH.